Patented May 1, 1923.

UNITED STATES PATENT OFFICE.

1,453,752

HAROLD E. COLLVER, OF SIMCOE, ONTARIO, CANADA, AND CHARLES R. MABEE, OF BUFFALO, NEW YORK.

FOOD COMPOUND AND PROCESS OF PRODUCING THE SAME.

No Drawing.    Application filed October 5, 1917.   Serial No. 194,970.

*To all whom it may concern:*

Be it known that we, HAROLD E. COLLVER, a subject of the King of Great Britain, and a resident of Simcoe, in the county of Norfolk, Province of Ontario, Canada, and CHARLES R. MABEE, a citizen of the United States, and a resident of Buffalo, Erie County, State of New York, have invented a certain new and useful Improvement in Food Compounds and Processes of Producing the Same; and we do hereby declare the following to be a clear and exact description of the same.

The object of the invention is to combine cabbage and milk products into a food compound, by removing a substantial portion of the water content therefrom, to reduce the volume of the product, to render the food value more easily preserved, to reduce the expense of handling the product, and to combine them in suitable proportions for consumption with a limited amount of labor by consumers. The invention involves the manufacture of a creamed-cabbage product which can be marketed in metal, glass, or other liquid tight containers, or in non-liquid tight containers, such as paraffine lined fibre containers, or the product can be wrapped in oil paper and placed in cartons in a manner similar to that in which butter prints are marketed.

It is known that in storing cabbage considerable loss results through various conditions to which it is subjected, and which tend to promote decomposition, and that considerable expense and care is involved in the handling of cabbage, especially when atmospheric temperature approaches the freezing point. This invention obviates all such losses and greatly reduces the expense of handling and shipping the product, and also the labor of preparing it for consumption, as well as preserving the entire food value, the greater portion of which is lost by the present method of preparing cabbage for consumption.

The edible portion of the cabbage head consists of 1.0% ash, 5.6% carbohydrates, .3% fat, 1.6% protein, and 91.5% water. The present method of preparing cabbage for consumption, which is most generally employed, involves boiling it in water, and it has been determined that approximately 6% of the total weight of the cabbage, or 70% of the solid content, is found in solution with the cooking water which is drained off with the cooking water and is therefore lost, whereas, by our method, all the food value in the cabbage is retained for consumption as food, together with substantially all of the natural taste and flavor.

By this method the cabbage is subjected to a cooking process, being heated by water or steam, for a suitable period of time, but not sufficient to destroy the fibrous formation. The cooking water or condensed steam, is then drained off, and preserved, and for the purpose of this specification, will hereafter be referred to as the "cooking water." The solid portion or solid residue, is then placed in a suitable press and through compression the greater portion of the cabbage juice is separated therefrom, much the same as grape juice is separated from the pulp in the grape. The cooking water and the cabbage juice are then combined and concentrated to a consistency, preferably of about 17.5% moisture, and 82.5% solids. During the concentration period the chloride of sodium, or other, suitable preserving and seasoning material may be advantageously added.

As the solids in the concentrated mass consist largely of protein and carbohydrates this concentrate is well adapted, when combined with the cabbage pulp from the press, to form an exterior coating to the pulp to prevent deteriorization, and to solidify the mass when the concentrate and pulp with the chloride of sodium, are combined.

To further protect and preserve the product, and to prepare it for use by consumers, with a limited amount of labor, the following method can advantageously be employed, and involves one of a series of steps as a portion of this invention. A milk product, such as condensed skim milk, condensed whole milk, melted butter fat, or any combination of milk products, can be combined with the cooking water and cabbage juice, either before or after concentration thereof is effected, and thoroughly mingled therewith by homogenization, or otherwise, so that when the combined vegetable and milk products, while heated sufficiently to melt butter fat, are combined with the cabbage pulp, semi-solid mass is formed, capable of being wrapped in oil paper, and placed in cartons, similar to the manner in which butter prints are marketed.

After the semi-solid colloidal mass is formed, if desirable, the exterior of the mass may be covered with a thin coating of butter fat or other air, light and heat resisting food product derived from dairy or vegetable products. By covering the mass in this manner it is more readily preserved and may to better advantage be wrapped in oil paper and placed in cartons or other non-liquid tight containers.

It is obvious that the same results can be accomplished by various series of steps, as for instance, the cooking water, cabbage juice, and milk products, can each be concentrated separately, or in any combination, and thereafter combined, or, the butter fat may be separated from the milk products, and used entirely as an exterior covering for the semi-solid mass when cooled. The coating can be effected by mechanical means, or the semi-solid mass can be dipped in melted butter fat or other air, light and heat resisting medium which might be employed as an exterior coating.

By this process the cabbage may be cooked under atmospheric pressure or at a pressure above atmosphere, and, although the concentration of the semi-liquids, the cooking water, the cabbage juice and the milk products, may be effected by any suitable means, it is preferable that concentration be effected as rapidly as possible, and in a continuous manner, in order to prevent unnecessary chemical changes, and facilitate the operation.

In the process herein contemplated and claimed, the particular proportion of milk product used in connection with the cabbage may vary widely, largely depending upon the particular taste to be given the resultant product, and therefore I do not desire to limit the invention to any relative proportions which may be found suitable, but desire to include broadly the process and product including cabbage and milk product as herein described. However, it may be observed that the proportion of one part milk product to two parts of the cooked water and cabbage juice will be found to result in a palatable mixture rich in food property and highly pleasing to the taste of the average user, but, as previously noted, a wide range of changes in relative proportion may be resorted to and still be within the keeping and spirit of the invention herein contemplated.

What is claimed is:

1. The product herein described, consisting of cabbage and milk, from which a portion of the water content has been removed, and to which an air-excluding covering has been applied.

2. A semi-solid colloidal mass, consisting of cabbage from which a substantial portion of the water content has been removed, and to which a milk product and a flavoring product has been added, and a protecting covering of fat.

3. The process of producing an improved food compound, which consists in cooking cabbage in water, removing a substantial portion of the water contents from the cabbage, condensing the same, mixing with the condensed product a milk product, and adding thereto a preservative in the form of a thin coating of butter fat.

4. The process of producing an improved food compound, which consists in abstracting a portion of the water content from cabbage and milk, coating the residue while heated, with melted butter fat, to form when cooled a semi-solid mass.

5. The process of producing an improved food compound, which consists in abstracting a portion of the water content from cabbage and milk, coating the residue while heated, with melted butter fat, to form when cooled a semi-solid mass.

6. The process of producing an improved food compound, which consists of cooking cabbage, separating the cabbage from the cooking water, compressing the cabbage to separate the cabbage juice from the cabbage pulp, condensing the cooking water and cabbage juice to a high consistency by removing a substantial portion of the water content, adding a milk product to the condensed product, and thereafter, while in a heated condition, adding thereto the cabbage pulp and thoroughly co-mingling the particles of the mass to form when cooled a semi-solid mass.

7. The process of producing an improved food product, which consists of cooking cabbage in water, separating the cabbage from the cooking water, compressing the cabbage to remove a portion of the water content therefrom and to separate the pulp, condensing the cooking water and the water separated by compression of the cabbage, adding thereto a milk product, and mixing while heated the mass with the cabbage pulp, to form when cooled a semi-solid mass.

8. The process of producing an improved food product, which consists in cooking cabbage, separating the cabbage from the cooking water and removing a portion of the water content of the cabbage to separate the pulp, condensing the cooking water and the water removed from the cabbage, and adding to said condensed mixture a milk product, and mixing the same with the cabbage pulp.

HAROLD E. COLLVER.
CHARLES R. MABEE.

Witnesses:
C. A. CHALLEN,
J. D. GLASS.